March 31, 1925.
M. LOUGHEAD
1,531,798
HYDRAULIC BRAKE
Filed Aug. 20, 1923
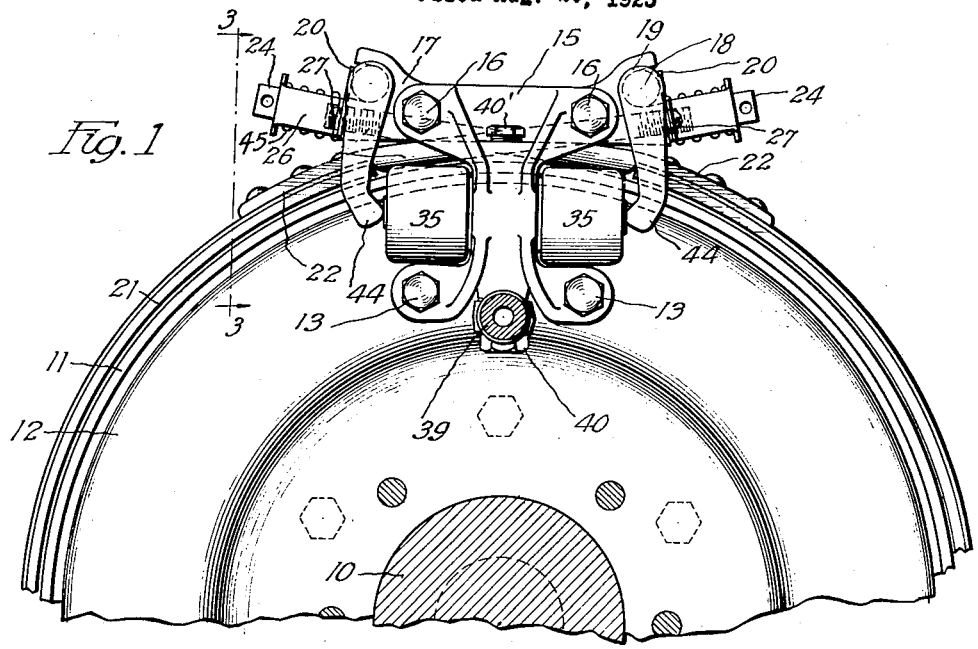
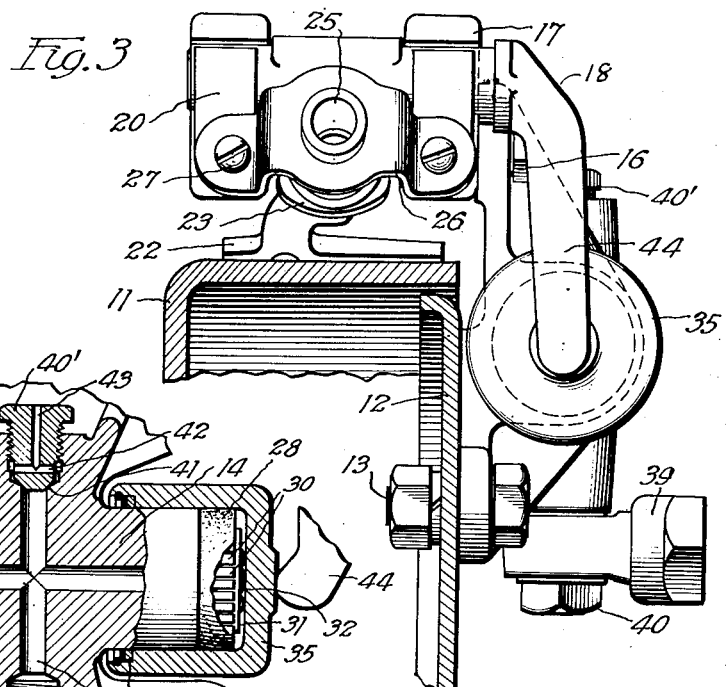
Inventor
Malcolm Loughead Patented Mar. 31, 1925.

1,531,798

UNITED STATES PATENT OFFICE.

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA.

HYDRAULIC BRAKE.

Application filed August 20, 1923. Serial No. 658,452.

*To all whom it may concern:*

Be it known that I, MALCOLM LOUGHEAD, a citizen of the United States, and resident of Detroit, in the county of Wayne and State of Michigan, have invented a certain new and useful Improvement in Hydraulic Brakes, of which the following is a full, clear, concise, and exact description, reference being had to the accompanying drawings, forming a part of this specification.

This invention relates to hydraulic brakes for vehicles such as automobiles, and particularly brakes of the character which are adapted to be applied to all four wheels.

The object of the invention is to provide fluid operated mechanism associated with the brake members, in which the side thrust due to the engagement of the operating member with the brake lever will be reduced to the minimum.

One of the features of the invention is the arrangement of the parts of the brake operating device so that the inner or piston member is relatively stationary while the outer or cylinder member is movable.

Another feature of the invention is the arrangement of the brake operating lever so as to engage the cylinder end substantially centrally thereof and adjacent to the surface engaged by the fluid under pressure.

Other features and advantages will appear from time to time during the description of the invention.

In devices of this character, where the piston is relatively movable, such as in applicant's prior filed application, Serial No. 658,451, filed August 20, 1923, the point of engagement of the brake lever is remote from the point of application of the fluid to the piston. Thus the friction of the brake lever on the end of the piston rod has a very definite tendency to cause a side thrust of the piston rod. Furthermore, as the piston rod is reduced in area and the opening through the guiding means is correspondingly small, there is a considerable tendency to wear the guiding means so as to admit dust and grit to the cylinder.

With the present structure, however, the tip of the brake operating lever engages the movable member or cylinder of the brake operating mechanism substantially centrally thereof, and as the surface acted upon by the operating fluid is adjacent to the point of application of the lever to the cylinder, the tendency to produce side thrust is considerably reduced. Furthermore, in view of the fact that the piston member of the present structure is of a size to closely fit within the cylinder, the bearing surface between the two members is of much greater area, thus reducing the tendency to wear.

It is believed that the further description of the invention will be best understood by reference to the accompanying drawings, in which—

Figure 1 is a side view of the upper portion of a brake drum, showing the operating means of the present invention mounted thereon;

Figure 2 is a vertical section through the cylinders and pistons of Figure 1, and Figure 3 is a view from the line 3—3 of Figure 1.

Referring now to the drawings, in which like reference characters indicate like parts in the several views, 10 is the axle of an automobile wheel, 11 the brake drum carried by a wheel mounted on the axle, and 12 is a closure plate for the brake drum. Secure to the plate 12 by means of the bolts 13 is a casting including the piston blocks 14 and an upwardly extending portion 15 adapted to be secured by means of the cap screws 16 to a plate 17 which overlies the edge of the brake drum. Rotatably mounted at the ends of the plate 17 are the brake levers 18 which are retained in the bearing sockets 19 by means of the plates 20.

Positioned about the brake drum 11 is a brake band 21 which may be of the usual character. Secured to each of the ends of the brake band 21 is a link 22 which passes through an opening in the shorter arm 23 of the U-shaped lever 18. Screw threaded on the projecting end of the link 22 is a sleeve 24 which passes through an opening 25 in a substantially U-shaped guiding member 26. The guide member 26 is secured to the mounting plate 15 by means of the screws 27 which also pass through the plates 20 and secure them in position.

The piston blocks 14 are arranged in alignment, and each is provided at the outer end thereof with a cup leather structure which is as follows: The outer end of each of the piston blocks 14 is slightly recessed, and a cup leather 28 is positioned thereon.

Arranged within the cup leather 28 is a cup leather expanding device 29, the laterally extending flange of which is split to provide a plurality of fingers 30. Within the expanding member 29 is a cup shaped member 31, a hollow cap screw 32 being passed through the members 31, 29 and 28 in screw threaded engagement with the bore of the piston block. The piston block structure is intersected by a pair of transverse bores 33 and 34.

Arranged about the end of the piston block 14 and the cup leather 28 is a cup-like cylinder 35, which is provided adjacent to its free edge with a felt washer 36 and a metallic washer 37, both being retained in position by means of the expanding C spring 38.

Fluid under pressure is admitted to the bore 34 through the fitting 39 and the hollow cap screw 40, and is then distributed through the bore 33 to the cylinders 35. The upper end of the bore 34 is offset, and a valve member 40' is screw threaded therein. The member 40' is provided at its lower end with a tapered or cone-shaped portion 41 which engages the metal adjacent to the end of the bore 34 and normally maintains it closed. When, however, it is desired to release air from the system, the member 40' is reversely turned to unseat the member 41, when air will pass upwardly about the member 41, then through the transverse bore 42 and the longitudinal bore 43.

Integral with or rigidly secured to each of the arms 23 of the levers 18 is a longer downwardly extending arm 44, the lower laterally projecting end of which is arranged to engage the end of one of the brake operating cylinders substantially centrally thereof.

Expansion springs 45 are arranged about the sleeve 24 between the guide members 26 and the arms 23 of the brake levers, and act to normally retain the brake band in retracted position. When, however, fluid under pressure is admitted through the bores 34 and 33 to the cylinders 35, the cylinders are moved outwardly away from each other, and consequently move the lever arms 23 away from each other, thus tightening the brake band about the brake drum.

As the piston blocks 14 snugly engage the inner surface of the cylinders 35, the cylinders are maintained in alignment, and side thrust or play is definitely prevented. Furthermore, due to the fact that the point of application of each brake lever 44 to its cylinder is immediately adjacent to the surface of the cylinder against which the fluid acts to move the cylinder outwardly, the tendency to side thrust is very greatly reduced.

While in the drawings and the above description, but a certain set of details has been disclosed, it is to be understood that certain modifications of the present invention are contemplated and the invention, therefore, should be limited merely by the scope of the appended claims.

Having thus described my invention, what I claim is new and desire to secure by Letters Patent of the United States is:

1. In a fluid operated brake system, an axle, a brake drum carried by said axle, a brake band adjacent to said drum, a piston block supported in fixed relation to said axle at the side of said drum, a piston on said block, a cylinder positioned about said piston, and a lever pivotally supported from said axle, one end of said lever being joined to said brake band, the other end being arranged to engage the end of said cylinder substantially centrally thereof.

2. In a fluid operated brake system, an axle, a brake drum carried by said axle, a brake band about said drum, a piston block supported at the side of said drum, a pair of oppositely disposed pistons on said block, cup-shaped cylinders, one on each of said pistons, a mounting plate supported above said brake drum, and a pair of levers pivotally supported on said mounting plate, said levers each having one end operatively engaged with the corresponding end of said band, and the other end arranged to engage the end of its respective cylinder substantially centrally thereof.

3. In a fluid operated brake system, an axle, a brake drum carried by said axle, a brake band about said drum, a closure plate for said drum, a piston block mounted on said closure plate, a pair of oppositely disposed pistons on said block, a pair of cup-shaped cylinders, one being positioned about each of said pistons, a fixed mounting plate overlying the periphery of said drum, a pair of levers pivotally supported on said plate, each of said levers including a pair of downwardly extending substantially parallel arms, and links joining the ends of said brake band to corresponding arms of said levers respectively, the other arm of each of said pairs being arranged to engage the end of its respective cylinder substantially centrally thereof.

4. In a fluid operated brake system, an axle, a brake drum carried by said axle, a brake member adjacent to said drum, a pair of pistons supported by said axle at the side of said drum, a cylinder movable over each of said pistons, and a pair of levers each being in operative relation to the end of its respective said cylinder for actuating said brake member.

5. In a fluid operated brake system, an axle, a brake drum carried by said axle, a brake band adjacent to said drum, a pair of pistons supported by said axle at the side of said drum, a cup-shaped cylinder positioned about each of said pistons, and a pair of levers pivotally supported from said axle, one end of each of said levers being joined to said brake band, and the other end being arranged to engage the end of one of said cylinders.

6. In a fluid operated brake system, an axle, a brake band carried by said axle, a brake member adjacent to said drum, a piston rigidly supported at the side of said drum, a cup-shaped cylinder positioned about said piston, a mounting plate overlying the periphery of said drum, and a lever pivotally supported on said mounting plate, one arm of said lever being operatively joined to said brake member, the other arm of said lever being arranged for engagement by the end of said cylinder.

7. In a fluid operated brake system, an axle, a brake drum carried by said axle, a brake band about said drum, a piston block supported in fixed relation to said axle, a pair of oppositely disposed pistons on said block, cup shaped cylinders, one being positioned about each of said pistons, a fixed mounting plate supported above said brake drum, and a pair of levers pivotally supported on said mounting plate, said levers each having one end operatively engaged with the corresponding end of said band, the other end being arranged to be engaged by the end of its respective cylinder.

8. In a fluid operated brake system, an axle, a brake drum carried by said axle, a brake band about said drum, a piston block rigidly supported at the side of said drum, a pair of pistons carried by said block, a pair of cup-shaped cylinders, one being positioned about each of said pistons, a mounting plate overlying the periphery of said drum, and a pair of levers pivotally supported on said mounting plate, each of said levers including a pair of downwardly extending substantially parallel arms, one of said arms of each lever being operatively connected to the corresponding end of said brake band, the other arm of each of said levers being arranged to engage the end of its respective cylinder substantially centrally thereof.

In witness whereof, I hereunto subscribe my name this 19th day of June, 1923.

MALCOLM LOUGHEAD.

Witnesses:
BURTON S. FLORADAY,
WALLACE F. OLIVER.